United States Patent
Lin et al.

(10) Patent No.: US 6,876,209 B2
(45) Date of Patent: Apr. 5, 2005

(54) CAPACITIVE ANGULAR POSITION SENSOR

(75) Inventors: Yingjie Lin, El Paso, TX (US);
Warren Baxter Nicholson, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/695,309

(22) Filed: Oct. 28, 2003

(65) Prior Publication Data

US 2004/0085079 A1 May 6, 2004

Related U.S. Application Data

(63) Continuation-in-part of application No. 10/228,817, filed on Aug. 27, 2002, now Pat. No. 6,774,642.

(51) Int. Cl.⁷ ............................................. G01R 27/26
(52) U.S. Cl. .................. 324/660; 324/662; 324/207.14; 324/207.2; 324/207.25
(58) Field of Search ....................... 324/207.12, 207.14, 324/207.2, 207.25, 660, 662, 686, 688; 340/870.37; 361/290, 292

(56) References Cited

U.S. PATENT DOCUMENTS

| | | | | |
|---|---|---|---|---|
| 4,755,731 A | * | 7/1988 | Anthony et al. | 324/660 |
| 5,077,635 A | * | 12/1991 | Bollhagen et al. | 361/287 |
| 6,483,321 B2 | * | 11/2002 | Brasseur | 324/660 |

* cited by examiner

*Primary Examiner*—Vincent Q. Nguyen
(74) *Attorney, Agent, or Firm*—Jimmy L. Funke

(57) ABSTRACT

A sensor assembly for sensing angular position of one object relative to another object. A capacitor is formed between a transmitter capacitor plate having a pair of transmitter electrodes and a receiver capacitor plate having preferably eight receiver electrodes forming four receiver electrode pairs. A dielectric rotor rotates between the plates, the rotor having first and second segments each subtending 67.5 which are mutually separated by a vacancy subtending 45 degrees, and further having a third segment subtending 45 degrees disposed between the first and second segments diametrically opposite the vacancy. An electrical circuit measures net charge induced on each of the receiver electrode pairs, wherein the charges indicate the angular position of said rotor relative to said transmitter and receiver capacitor plates.

14 Claims, 13 Drawing Sheets

CAPACITIVE ANGULAR POSITION SENSOR

CROSS-REFERENCE TO RELATED APPLICATIONS

The present application is a continuation-in-part application of Ser. No. 10/228,817, filed on Aug. 27, 2002 now U.S. Pat. No. 6,774,642.

TECHNICAL FIELD

This present invention relates to position sensors and particularly to angular or rotary position sensors.

BACKGROUND OF THE INVENTION

Position measurements, including both linear and angular measurements, are widely implemented in industrial automation control. In particular, the automotive industry is using more and more linear/angular position sensors for closing various control loops. For example, sensors are used in steer-by-wire systems to determine the angular position of the steering column; sensors are used to determine the angular position of the throttle in engine control modules; sensors are used to determine the brake pedal position and/or the brake master cylinder position in brake-by-wire systems; and sensors are used in vehicle smart suspension systems.

Known technologies that can be used to determine angular position include contact measurement, such as a resistance stripe, or non-contact measurement effects, based on inductance, capacitance, optical, or magnetic field. Sensors based upon a capacitive effect have been found to be particularly desirable in many automotive applications. Whereas some known capacitive position sensors are generally effective to provide an accurate indication of angular position in a non-contact environment, they tend to be rather complex and rather expensive and therefore not always amenable to the high volume and low cost requirements of automotive applications.

SUMMARY OF THE INVENTION

This present invention is directed to the provision of an improved angular position sensor. More particularly, this present invention is directed to the provision of an improved capacitive angular position sensor especially suitable for various automotive applications.

The sensor of the present invention is intended for use in sensing the angular position of a rotatable body such as, for example, a steering column of a motor vehicle.

According to the present invention, the sensor includes a stationary transmitter capacitor plate defining a transmitter surface area, the transmitter surface area including at least one transmitter electrode and a stationary receiver capacitor plate defining a receiver surface area generally corresponding in size to the transmitter surface area, the receiver surface area including at least a first receiver electrode and a second receiver electrode, the electrodes of the respective capacitor plates facing each other. Positioned in an air gap between the capacitor plates is a rotor formed of a dielectric material adapted to be fixedly secured to the rotatable body so as to rotate with the rotatable body. The rotor defines a rotor area at least as large as a transmitter electrode surface area and a receiver electrode surface area and is sized so that, in response to angular movement of the rotatable body, the rotor varies a capacitance between each transmitter electrode and an opposed receiver electrode. The sensor includes means for measuring the charge induced on the receiver electrodes whereby the charges indicate the angular position of the rotatable body.

The sensor can include an alternating current source for supplying an excitation signal to at least the first transmitter electrode. Preferably, the sensor includes means for comparing at least a first charge induced on a first receiver electrode to a second charge induced on a second receiver electrode to determine the angular position.

In a preferred embodiment of the present invention, the transmitter capacitor plate is generally circular with an aperture adapted to receive a shaft of the rotatable body and includes a first transmitter electrode and a second transmitter electrode, the first and second transmitter electrodes being equally-sized and located about an outside edge of the transmitter capacitor plate. This embodiment can include means for supplying a first alternating current (AC) excitation signal to the first transmitter electrode and for supplying a second AC excitation signal to the second transmitter electrode wherein the first and second AC excitation signals are the same amplitude but with 180 degrees out of phase from each other. These AC excitation signals are preferred to be square waveform signals.

In another embodiment of the present invention, the receiver capacitor plate is generally circular with an aperture adapted to receive a shaft of the rotatable body and includes at least four equal-sized receiver electrodes located about an outside edge of the receiver capacitor plate, each of two diametrically opposed electrodes forming a receiver electrode pair. Preferably, then, the rotor has at least one circular wedge whose outside edge is a circular arc larger in size to a portion of the outside edge of the receiver capacitor plate, the size of the circular wedge equivalent to at least a size of one receiver electrode wherein the radius of the circular wedge is larger than that of the receiver electrode. Thus, the high dielectric constant of the rotor as compared to the air gap will result in changing capacitance between the transmitter electrodes and at least one of the receiver electrode pairs.

Yet another embodiment of the present invention is seen where each of the capacitor plates is circular with aligned central apertures through which a shaft of the rotatable body can rotate, and the rotor has at least one circular wedge configuration and is adapted to be fixedly secured to the shaft at a center of the circle of which the circular arc of the outside edge of the circular wedge is a portion of the circumference of the rotor.

In a first aspect of the present invention used to measure 360 degrees of rotation of the rotatable body, the transmitter capacitor plate is generally circular with an aperture adapted to receive a shaft of the rotatable body and includes a first transmitter electrode and a second transmitter electrode, the two electrodes being equally-sized and generally semi-circular. Similarly, the receiver capacitor plate is generally circular with an aperture adapted to receive the shaft and includes four equally-sized receiver electrodes located about an outside edge of the receiver capacitor plate, each of two diametrically opposed electrodes being connected to form a first receiver electrode pair and a second receiver electrode pair. The rotor has a semi-circular shape and is adapted to be fixedly secured to the shaft at the geometric center of the circle defined by the circumference of the semi-circular rotor. The rotor with a larger radius is sized so that, in response to rotation of the shaft, the rotor varies the capacitance between the first transmitter electrode and a first pair of adjacent receiver electrodes and the capacitance between the second transmitter electrode and a second pair of adjacent receiver electrodes. Finally, a charge to voltage measuring means of the sensor, for example a current to voltage converter, converts a first charge induced on the first receiver electrode pair and converts a second charge induced on the second receiver electrode pair whereby the first and second converted voltages indicate the angular position of the rotatable body.

In a second aspect of the present invention used to measure 360 degrees of rotation of the rotatable body, the transmitter capacitor plate is, preferably, identical to the transmitter capacitor plate of the first aspect of the present invention. The transmitter capacitor plate is generally circular with an aperture adapted to receive a shaft of the rotatable body and includes a first transmitter electrode and a second transmitter electrode, the two electrodes being equally-sized and generally semi-circular. Similarly, the receiver capacitor plate is generally circular with an aperture adapted to receive the shaft and includes eight equally-sized receiver electrodes located about an outside edge of the receiver capacitor plate, each of two diametrically opposed electrodes being connected to form a first receiver electrode pair, a second receiver electrode pair, a third receiver electrode pair, and a fourth receiver electrode pair. The rotor, derived from the semi-circular shaped rotor of the first aspect of the present invention, has three generally circular wedge sections or segments, wherein a generally circular wedge subtending an angle of 45 degrees, 22.5 degrees on either side of the center of the semi-circular rotor, is removed from the semi-circular rotor and is rotated 180 degrees about the chord of the semi-circular rotor, thereby being positioned equidistant from the resulting two 67.5 degree generally circular wedges, and is adapted to be fixedly secured to the shaft at the geometric center of the circle defined by the circumference of the semi-circular rotor. The rotor is designed such that when at least one edge of a receiver electrode is aligned with at least one edge of a rotor segment at least one edge of a rotor segment will be located at the center of at least one receiver electrode. The rotor with a larger radius is sized so that, in response to rotation of the shaft, the rotor varies the capacitance between the first transmitter electrode and a first set of four adjacent receiver electrodes and the capacitance between the second transmitter electrode and a second set of four adjacent receiver electrodes wherein two diametrically opposed receiver electrodes, one of the first set and the other of the second set, form a first receiver electrode pair, a second receiver electrode pair, a third receiver electrode pair, and a fourth receiver electrode pair. Finally, a current to voltage converter means of the sensor converts a first, second, third, and fourth charge induced on the first, second, third, and fourth receiver electrode pairs whereby the first, second, third, and fourth converted voltages indicate the angular position of the rotatable body.

The first and second aspects of the present invention can include means for supplying a first AC excitation signal to the first transmitter electrode and for supplying a second AC excitation signal to the second transmitter electrode wherein the first and second AC excitation signals are 180 degrees out of phase from each other. This supply means can include a square wave generator with a frequency in a preferred range of 20 to 100 kHz (it could be up to MHz range, but the range from 1 kHz to 100 kHz is preferred) supplying the first AC excitation signal and an analog inverter receiving the first AC excitation signal and producing the second AC excitation signal.

The voltage measuring means can include a current to voltage converter for receiving a current difference between one receiver electrode of a receiver electrode pair and the other receiver electrode of the receiver electrode pair and producing an AC voltage representing a charge induced on the receiver electrode pair. Then, the sensor can include means for converting the AC voltage to a direct current (DC) voltage.

The means for converting the AC voltage can include an integrating, or level hold, capacitor for receiving the AC voltage and converting the AC voltage to a DC voltage. In the first and second aspects of the present invention including this feature, the sensor can also include means for connecting the integrating capacitor to receive the AC voltage only during either a positive half cycle or a negative half cycle of the first AC excitation signal.

In order to minimize temperature effects by having separate voltage measuring channels, only one voltage measuring means is preferred to measure the voltages of each receiver electrode pair in the first and second aspects of the present invention. Thus, the sensor preferably includes a receiver pair select switch for selectively enabling a current flow from each individual receiver electrode pair, depending upon the position of the switch. In order to sample all receiver pairs, the sensor may include means for controlling the receiver pair select switch.

In the first and second aspects of the present invention including the integrating capacitor, the sensor can also compare at least a first DC voltage at the integrating capacitor resulting from a current difference between one receiver electrode of at least a first receiver electrode pair and the other receiver electrode of the first receiver electrode pair to known voltages corresponding to angular positions of the rotatable shaft. The actual angular position is the result of the comparisons between receiver electrode pairs. This can be done using a look up table in an integral microcontroller or in the engine microcontroller.

Preferably, in the first and second aspects of the present invention the receiver capacitor plate includes a guard trace on the receiver surface area, the guard trace adjacent an outside edge of the receiver capacitor plate and located so as to prevent the interaction of adjacent electric fields. Of course, the transmitter capacitor plate can include such a guard trace, which is particularly desirable when the plate includes two transmitter electrodes.

Other applications of the present invention will become apparent to those skilled in the art when the following description of the best mode contemplated for practicing the present invention is read in conjunction with the accompanying drawings.

DESCRIPTION OF THE PREFERRED EMBODIMENT

The sensor assembly of the present invention is intended for use in measuring the angular position of any rotatable body, but is especially suitable for use in automotive applications where it is desired to determine the angular position of a rotating shaft, such as, for example, the vehicle steering column shaft.

Figure 1:
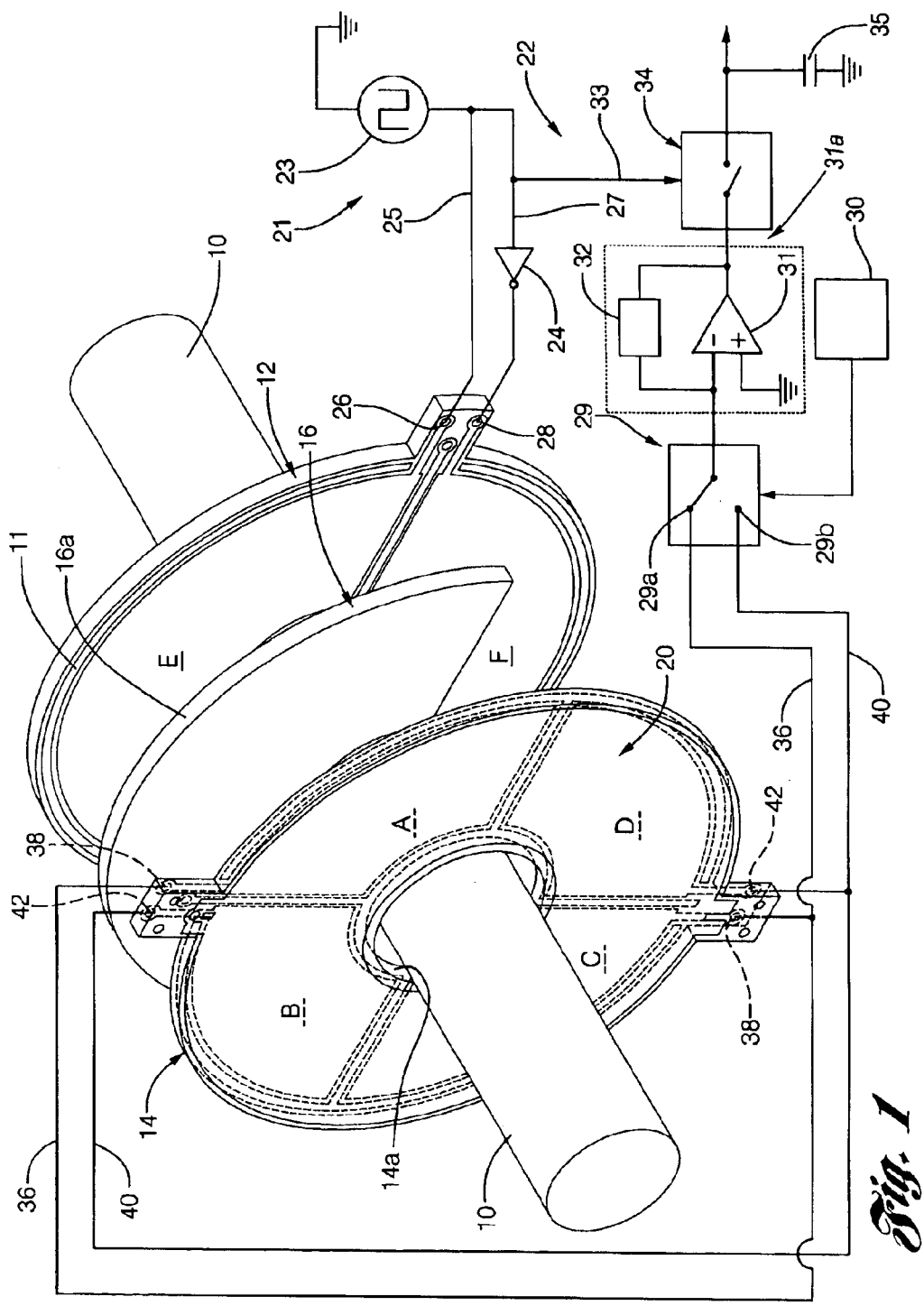
FIG. 1 is a perspective view of a sensor according to the first aspect of the present invention.

The sensor of the first aspect of the present invention is illustrated for use with a shaft, such as the shaft 10 seen in FIG. 1 (in the example above, the steering column shaft) and, broadly considered, includes a transmitter plate 12, a receiver plate 14, a rotor 16 and sensor electronics 21, 22.

Figure 4:
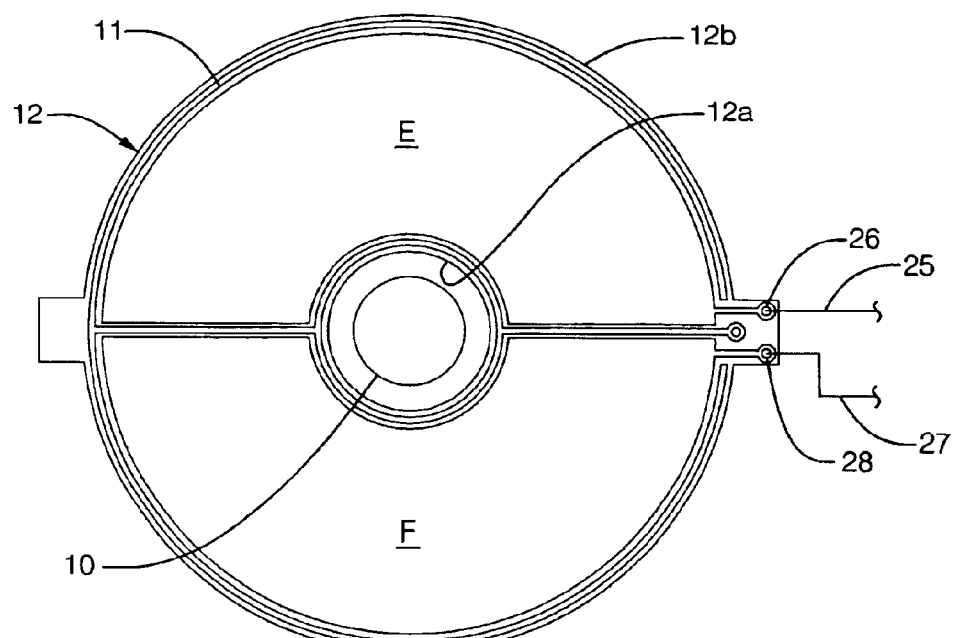
FIG. 4 is a view of an electrode face of a transmitter capacitor plate of the sensor according to the first and second aspects of the present invention.
Figure 5:
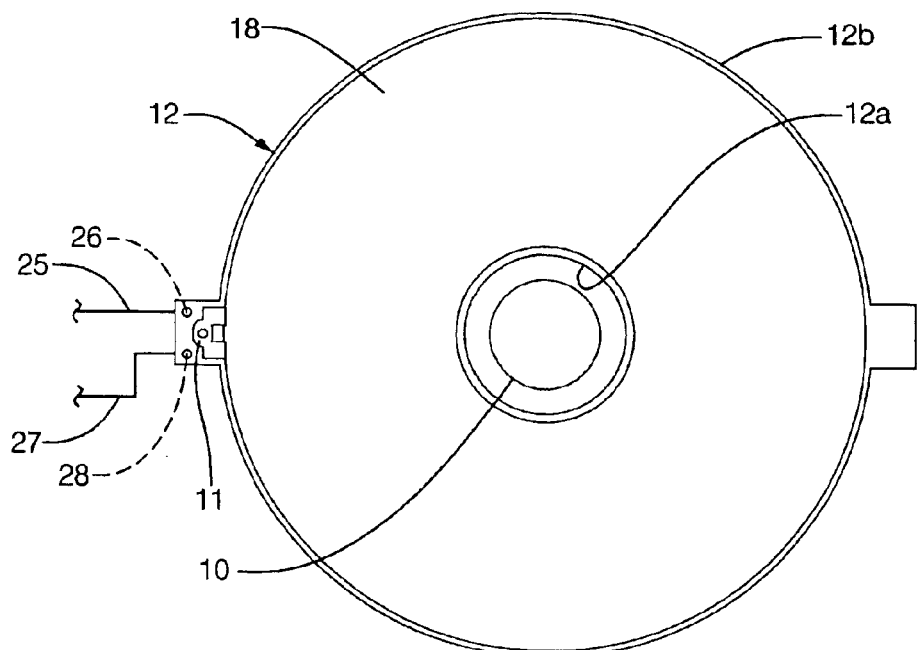
FIG. 5 is a view of a shielded face of the transmitter capacitor plate according to the first and second aspects of the present invention.

As shown in detail in FIGS. 4 and 5, the transmitter plate 12, utilized in the first and second aspects of the present invention, has a generally circular configuration and includes a central hole 12a sized to freely pass shaft 10. One face of the plate 12 is electrically shielded by a shield 18 and the other face of the plate 12 is divided into two equally-sized, semicircular transmitter plates, or electrodes, E and F. A ground guard trace 11, which operates to prevent the interaction of adjacent electric fields, mostly encircles the peripheral edge 12b of the plate 12 and forms the boundary between transmitter electrodes E and F. Specifically, as shown in FIG. 4, the ground guard trace 11 encircles the peripheral edge 12b, except for the area around the terminals 26, 28, discussed herein. The trace 11 also extends in a line from the far side of the peripheral edge 12b to a point between the terminals 26, 28 and encircling the central hole 12a.

Figure 2:
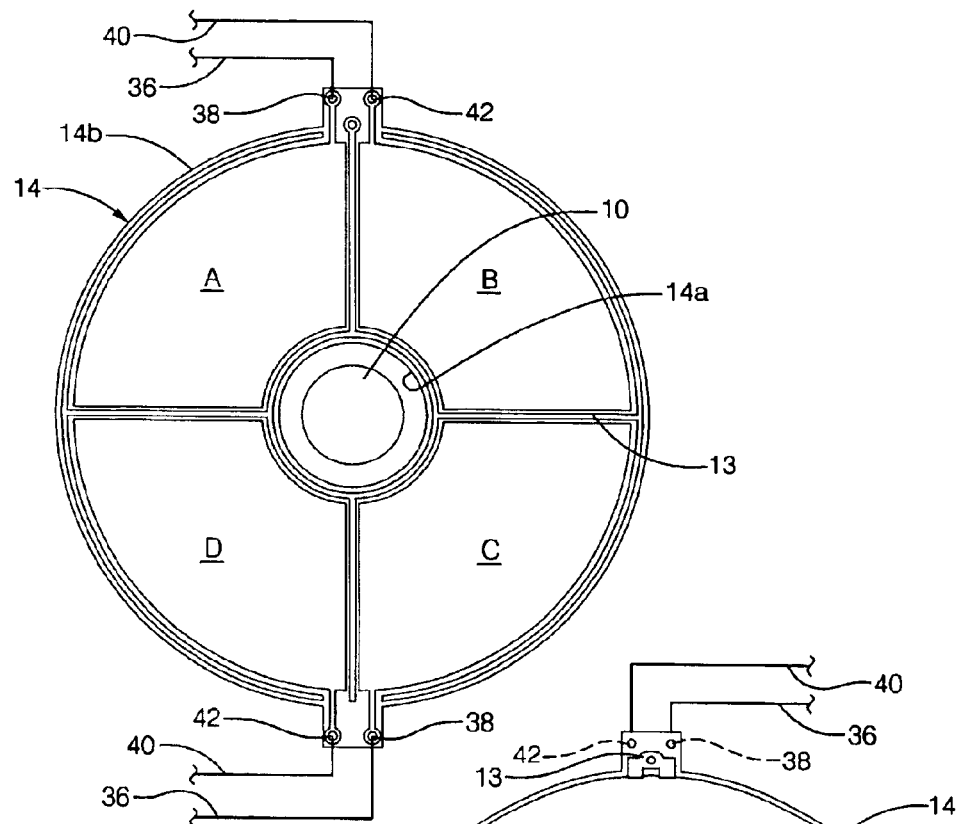
FIG. 2 is a view of an electrode face of a receiver capacitor plate of the sensor according to the first aspect of the present invention.
Figure 3:
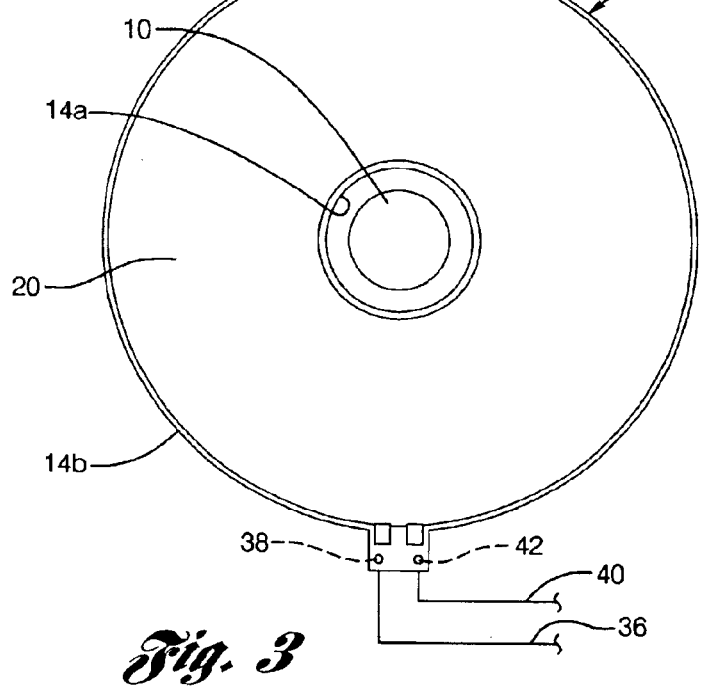
FIG. 3 is a view of a shielded face of the receiver capacitor plate according to the first aspect of the present invention.

The receiver plate 14, shown in detail in FIGS. 2 and 3, utilized in the first aspect of the present invention, has a generally circular configuration corresponding to the size and shape of the transmitter plate 12 and has a central aperture 14a sized to pass shaft 10. One face of the receiver plate 14 is shielded by a shield 20. The other face of the receiver plate 14 is divided into four equally-sized, roughly pie-shaped receiver plates, or electrodes A, B, C, and D, defining two receiver electrode pairs AC and BD, wherein the electrodes in each pair are located on the plate 14 diametrically opposed to each other. A ground guard trace 13 mostly encircles the peripheral edge 14b of the plate 14, which, like the ground guard trace 11, operates to prevent the interaction of adjacent electric fields. Specifically, as shown in FIG. 2, the ground guard trace 13 encircles the peripheral edge 14b, except for the area around the terminals 38, 42, discussed herein. The trace 13 extends in a line from the far side of the peripheral edge 14b, separating receiver electrodes A and B from receiver electrodes C and D and encircling the central hole 14a. The guard trace 13 then extends in two lines from the portion encircling the central hole 14a to points between each of the pairs of terminals 38, 42, separating receiver electrodes A and D from receiver electrodes B and C.

Figure 6:
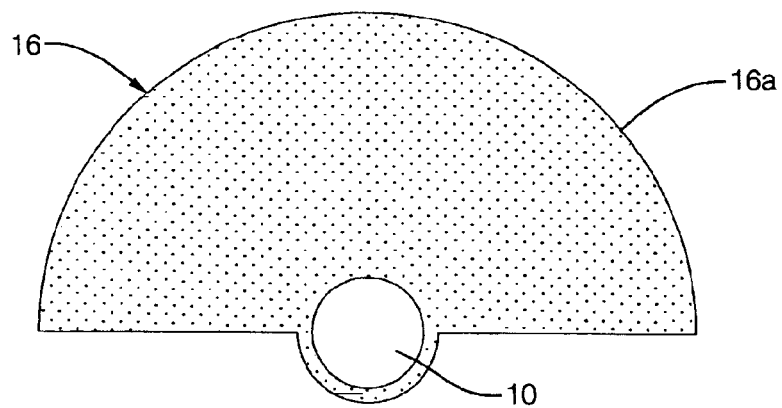
FIG. 6 is a view of a dielectric rotor of the sensor according to the first aspect of the present invention.

In construction, the electrodes of the transmitter plate 12 and the electrodes of the receiver plate 14 face each other. The rotor 16, shown in FIG. 6, has a semicircular configuration and is fixedly secured to shaft 10 at the geometric center of the circle defined by the circumference 16a of the semicircular rotor 16. The rotor 16 may be formed of any suitable high dielectric constant material and preferably a material having a dielectric constant of 10 or more. The radius of the rotor 16 is preferred to be greater than the both the radius of the receiver electrodes A, B, C and D and the radius of the transmitter electrodes E and F. The rotor 16 is positioned for rotation between the capacitor plates 12 and 14 as discussed below.

Figure 7:
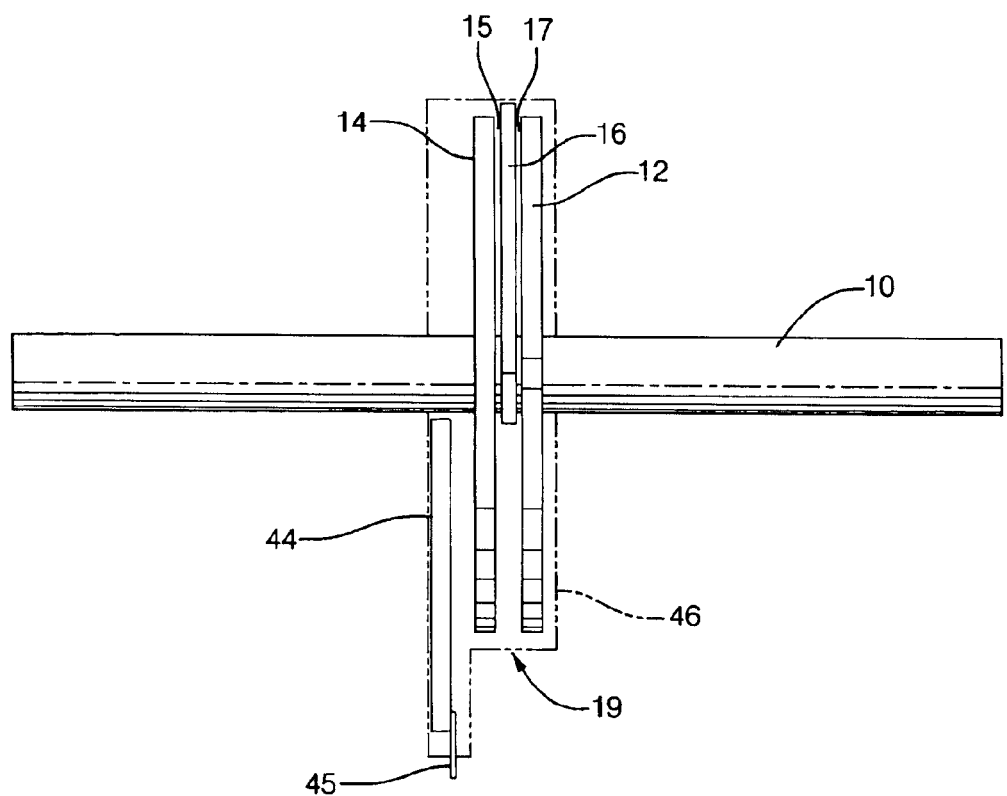
FIG. 7 is a side elevational view of the sensor according to the first aspect of the present invention.
Figure 10:
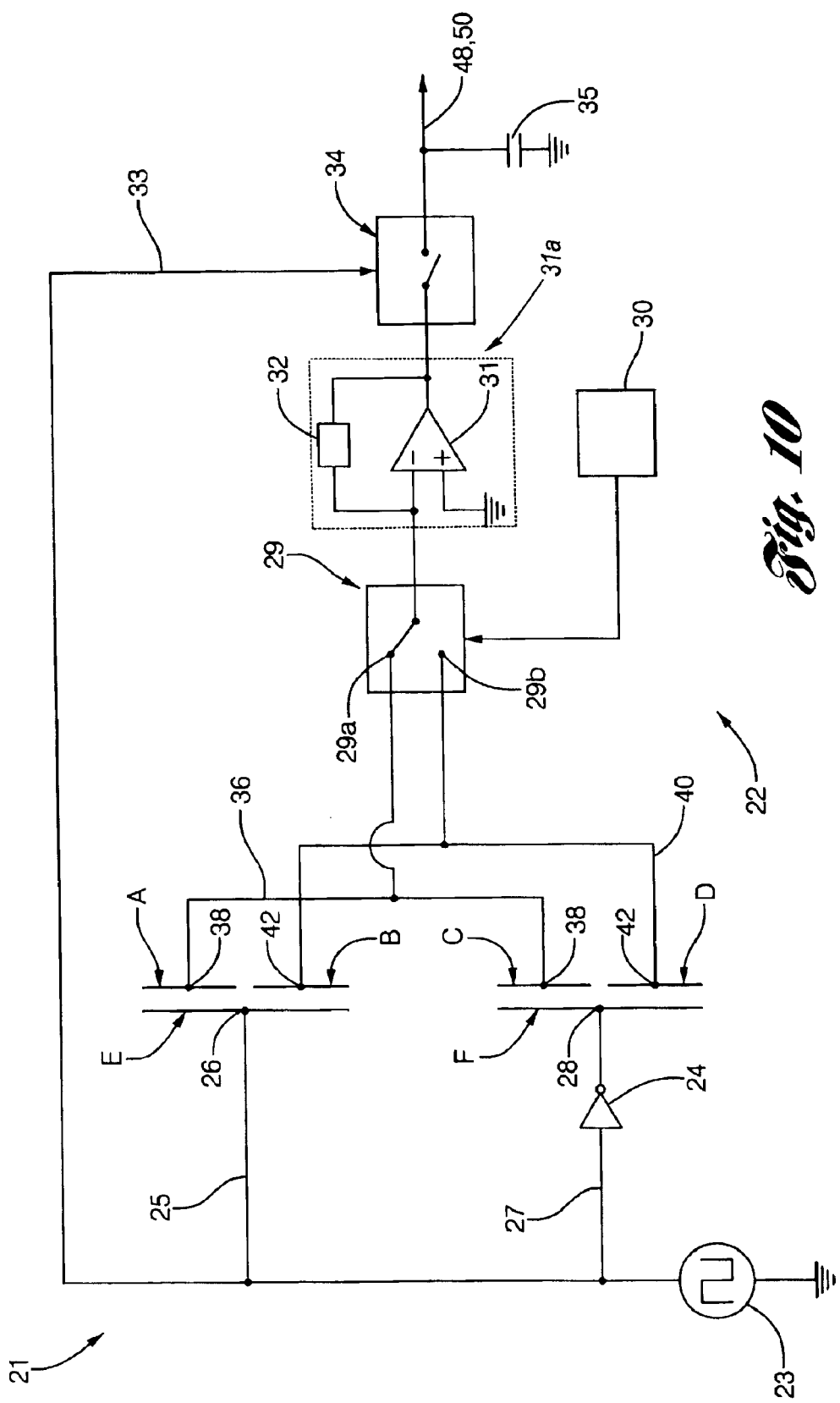
FIG. 10 is a circuit diagram of control circuitry for the sensor according to the first aspect of the present invention.

The circuit block diagram of FIGS. 1 and 10 depicts a circuit 21 for energizing the transmitter electrodes E and F of the transmitter plate 12 and a circuit 22 for decoding the output of the sensor, providing DC analog output voltages indicative of the angular position of the rotatable body. As shown in FIG. 7, the circuitry means 21 and 22 may be provided, for example, on a printed circuit board 44. Similarly, capacitor plates 12 and 14 can be formed as printed circuit boards. Together with the rotor 16, the board 44 and capacitor plates 12 and 14 may be positioned within a suitable housing 46 seen in dashed lines, whereby to provide a compact package for the assembly. Plates 12 and 14 define an air gap 19 in which the rotor 16 rotates. The rotor 16 is of a thickness that fills the air gap 19 to change the capacitance between the plates due to its high dielectric constant with respect to air. However, the rotor 16 is not in tight contact with the plates 12 and 14. Specifically, small air gaps 15 and 17 are defined between the capacitor plates 12 and 14 and the rotor 16, respectively, on each side of the rotor 16. The width of the air gap 15 on one side of the rotor 16 is substantially equal to the width of the air gap 17 on the other side of the rotor 16. Although it is clear from the description that the rotor 16 does not completely fill the air gap 19 due to the presence of air gaps 15 and 17, the air gaps 15 and 17 are small enough that the rotor 16 can be referred to as filling the air gap 19 between the plates 12 and 14. Because the plates 12 and 14 are stationary, it is clearly seen that no electrical connection needs to be made to any rotating part.

Figure 8A:
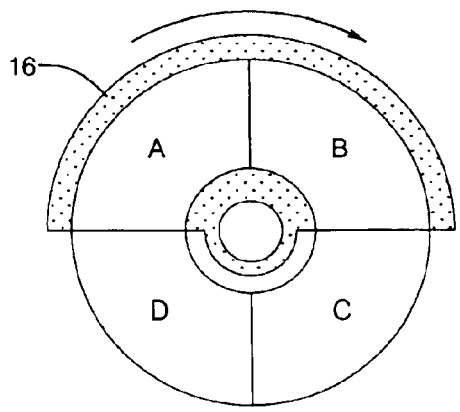
FIGS. 8A–8D are progressive views showing the successive rotational positions of the rotor according to the first aspect of the present invention.
Figure 8B:
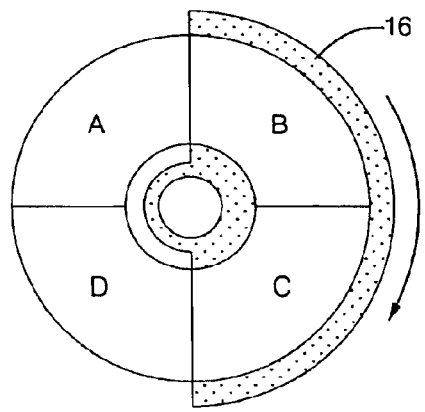
Figure 8C:
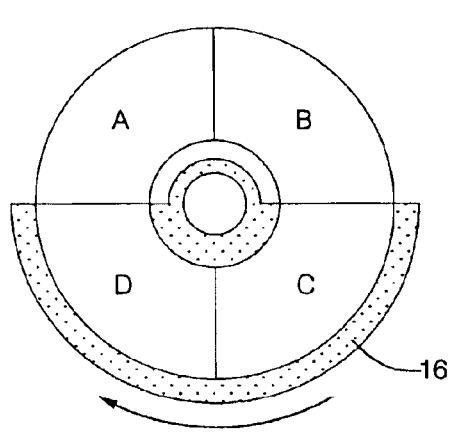
Figure 8D:
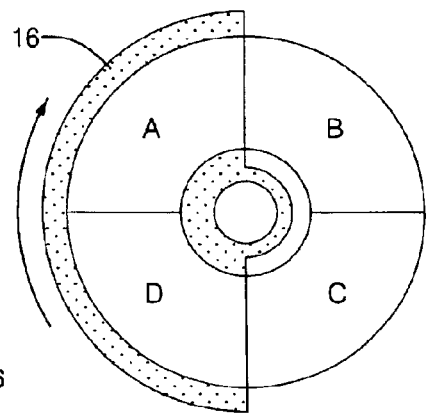

The rotor 16 has a radius generally larger to the radius of the plates 12 and 14 so that, by virtue of its semicircular configuration, it is spaced to fill the air gap 19 between one complete transmitter electrode and a pair of complete receiver electrodes, or portions of the two transmitter electrodes and one complete receiver electrode and portions of two adjacent receiver electrodes, or half of the two transmitter electrodes and two complete receiver electrodes, at any given time. Specifically, and with reference to FIGS. 8A–8D, as the rotor 16 turns in response to rotation of the shaft 10, the rotor 16, in successive angular positions, is spaced in, and fills, the air gap between:

(1) transmitter electrode E and its opposed pair of adjacent receiver electrodes A and B, which position is arbitrarily considered to be the 0 or 360 degrees start point of rotation and is shown in FIG. 8A;

(2) portions of transmitter electrodes E and F and receiver electrode B and portions of receiver electrodes A and C;

(3) portions of transmitter electrodes E and F and receiver electrodes B and C, which is 90 degrees of rotation of the rotor and is shown in FIG. 8B;

(4) portions of transmitter electrodes E and F and receiver electrode C and portions of receiver electrodes B and D;

(5) transmitter electrode F and its opposed pair of adjacent receiver electrodes C and D, which represents 180 degrees of rotation of the rotor as shown in FIG. 8C;

(6) portions of transmitter electrodes F and E and receiver electrode D and portions of receiver electrodes C and A;

(7) portions of transmitter electrodes F and E and receiver electrodes D and A, which is shown in FIG. 8D and which represents 270 degrees of rotation of the rotor;

(8) portions of transmitter electrodes F and E and receiver electrode A and portions of receiver electrodes D and B; and (9) finally back to its starting point, between transmitter electrode E and its opposed pair of adjacent receiver electrodes A and B, shown in FIG. 8A.

This capacitance position sensor thus varies the dielectric constant between the electrodes of the plates 12, 14 in order to change the capacitance between them by rotation of the rotor 16. The capacitance between the electrodes is directly related to their area, times the dielectric constant, divided by the spacing between the electrodes. Air has a dielectric constant of 1.0006, and the rotor 16, as mentioned, preferably has a dielectric constant greater than 10. Thus, as the rotor 16 rotates, the capacitance between the electrodes increases until the high dielectric constant rotor 16 fills the space between the electrodes.

FIG. 10 shows the circuit block diagram of the circuitry means 21 and 22 with the electrodes A–F of the plates 12 and 14 schematically represented. The control circuitry for the sensor includes means 21 for applying an alternating current to the transmitter plate 12 and means 22 for measuring the voltage induced on the receiver plate 14, wherein voltages measured serve as a measure of the angular position of the shaft 10. The circuit means 21 and 22 are best described with reference to the operation of the sensor.

The means 21 for applying alternating current to the transmitter electrodes E, F of the transmitter plate 12 includes a square wave generator 23 and an analog inverter 24. Preferably, the square wave generator 23 generates an output voltage of, for example, −5 volts direct current (DC) to +5 volts DC at a frequency between, but not limited to, 1 kHz and 100 kHz. The signal to transmitter electrode E is transmitted from the generator 23 via a lead 25 and the terminal 26. The signal to the transmitter electrode F is transmitted from the generator 23 via a lead 27 and the terminal 28. Prior to the signal being received at the terminal 28, it passes through an inverter 24. Thus, the voltage signals supplied to the two electrodes E and F are 180 degrees out of phase with each other. For example, when the square wave from the generator 23 makes the transition from −5 volts to +5 volts DC, a +5 volt level will be supplied to transmitter electrode E through lead 25 and the analog inverter 24 will invert the +5 volts to −5 volts, which is supplied to the transmitter electrode F through lead 27 (wherein, lead 27 better indicates the line between the analog inverter 24 and the terminal 28).

In operation, the rotor 16 is first in the 0 degree position, which has been previously arbitrarily assigned the position shown in FIG. 8A wherein the rotor 16 fills the space between transmitter electrode E and its pair of adjacent receiver electrodes A and B. Thus, the capacitance between transmitter electrode E and receiver electrodes A and B is greater than the capacitance between transmitter electrode F and its pair of adjacent receiver electrodes C and D. The receiver pair select switch 29 will be in the first input position 29a. The first input position 29a is connected to receiver electrode pair AC via leads 36 and terminals 38. With the transmitter electrode E at a positive potential, the receiver electrodes A and B are negative with respect to transmitter electrode E. Similarly, with the transmitter electrode F at a −5 volt potential, receiver electrodes C and D are positive with respect to transmitter electrode F. At this point in the operation of the sensor, the capacitor formed by electrodes A and E has more charge than the capacitor formed by electrodes C and F due to the high dielectric constant of the rotor 16 as compared to air. With electrode pair AC connected through the lead 36, a net positive charge flows through the analog switch 29 to the inverting input of an operational amplifier (op amp) 31 configured as a current to voltage converter 31a with negative feedback containing an impedance 32. The non-inverting input of the op amp 31 is grounded.

The output of the op amp 31 is a negative voltage whose voltage level is determined by the resistance of the feedback impedance 32. When the square wave output of generator 23 makes its transition from +5 volts DC to −5 volts DC, the capacitor formed by electrodes A and E and the capacitor formed by electrodes C and F reverse charge, which means that a net negative charge flows into the inverting input of the op amp 31 from the lead 36 connecting electrode pair AC. The negative input to the op amp 31 results in a positive voltage output from the op amp. Thus, the output of the current to voltage converter 31a is a square wave that matches the frequency of the drive square wave from the generator 23, and whose amplitude is dependent on the charge difference between the connected pair of electrodes, here electrode pair AC.

If the rotor 16 is rotated 45 degrees clockwise from FIG. 8A, then half of the receiver electrode A and half of the receiver electrode C is affected by the influence of the rotor 16. The capacitor formed by electrodes A and E and the capacitor formed by electrodes C and F have the same capacitance, or charge, but the charge is of opposite polarity so the net charge is zero. A zero input signal into the current to voltage converter 31a, of course, results in a zero output voltage. Thus, on the negative half cycles of the output of generator 23, as the rotor 16 turns through 45 degrees, the amplitude of the square wave output of the op amp 31 goes from its maximum voltage to zero. As the rotor 16 reaches 90 degrees, which is shown in FIG. 8B, the amplitude of the op amp 31 output decreases to a minimum voltage. Between 90 and 180 degrees, the voltage output stays at the minimum. Between 180 and 225 degrees, the output of the op amp 31 rises from the minimum voltage to zero, and between 225 and 270 degrees, the output of the op amp rises from zero to the maximum output voltage. Finally, between 270 and 360, or 0, degrees, the voltage output generated at the output of the op amp 31 stays constant at the maximum voltage.

The synchronous switch 34, which receives as its input the alternating current (AC) analog output voltage of the op amp 31, closes the switch to a level hold capacitor 35 when the square wave drive is, for example, negative through the lead 33. Through the synchronous switch 34, a DC analog output is produced from the AC analog output of the current to voltage converter 31a. Specifically, starting the measurement again at zero degrees, the square wave output of the generator 23 has just made its transition to −5 volts DC. The net negative charge from receiver electrode pair AC flows through the lead 36 and the analog switch 29 into the inverting input of the op amp 31, and the positive output voltage of the current to voltage converter 31a flows through the closed synchronous switch 34 to the level hold capacitor 35. Thus, a DC analog output representing the capacitance of the electrode pair AC results. When the generator 23 square wave switches to +5 volts DC, the synchronous switch 34 opens. The level hold capacitor 35 holds the charge until the next negative transition. If the rotor 16 turns 45 degrees clockwise from its position in FIG. 8A, the capacitor formed by electrodes A and E and the capacitor formed by electrodes C and F are equal but have opposite charge which results in a net input of zero volts into the current to voltage converter 31a and an output of zero volts. The level hold capacitor 35 thus has zero volts across it after a couple of cycles at the frequency of the generator 23.

Figure 9:
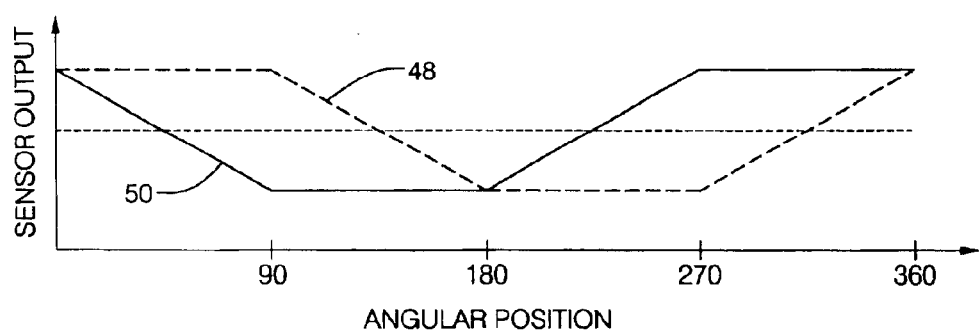
FIG. 9 is a graph of the sensor outputs related to the rotational positions of the rotor according to the first aspect of the present invention.

As the rotor 16 rotates to its 90 degree position, shown in FIG. 8B, the capacitor formed by electrodes C and F has a greater capacitance than the capacitor formed by the electrodes A and E due to the presence of the high dielectric rotor 16 between electrodes C and F. This means that on the negative portion of the square wave of the generator 23, there is greater positive charge at the junction of the electrode pair AC that flows into the inverting input of the op amp 31, and thus a correspondingly greater negative voltage output. The level hold capacitor 35 charges to the negative output voltage. Note that the level hold capacitor 35 is only connected by the synchronous switch 34 during the negative part of the generator 23 cycle. This means that what happens during the other half of the cycle does not affect the output voltage on the level hold capacitor 35. This DC analog output developed for the receiver pair AC as the rotor 16 rotates from zero to 90 degrees is shown in FIG. 9 as the solid curve labeled 50. In the same manner, the remainder of the output curve for the receiver pair AC shown in FIG. 9 is developed. When the analog switch 29 is connected so that the signal from the receiver pair BD is supplied to the current to voltage converter 31a through the terminals 42 and leads 40, that is, the analog switch 29 is connected to its input 29b, the output curve for the receiver pair BD is developed. This curve is shown in FIG. 9 as the dashed line 48. It is to be noted that the level hold capacitor 35 may also be only connected by the synchronous switch 34 during the positive portion of the generator 23 cycle instead of the negative portion to obtain correspondingly similar output curves.

Figure 11:
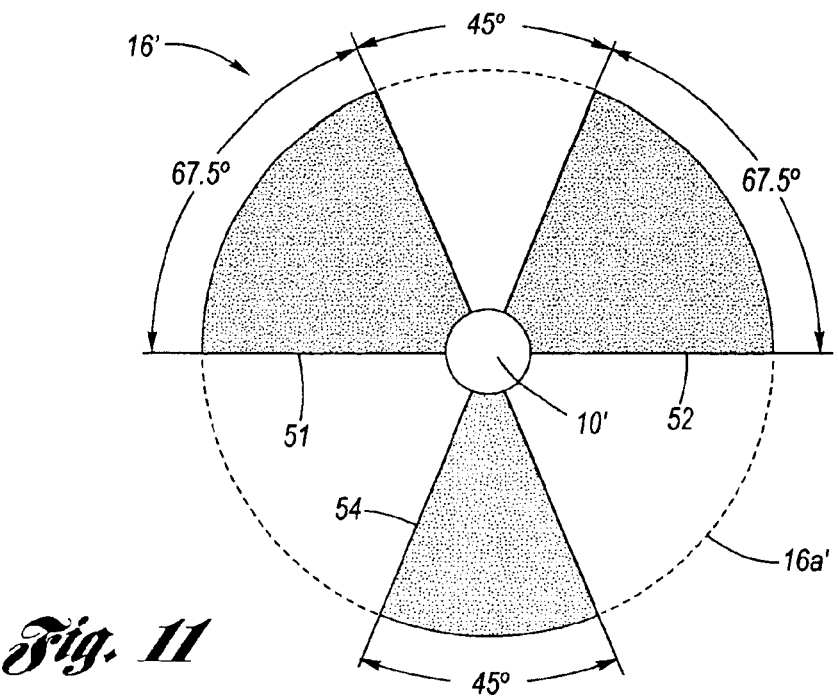
FIG. 11 is a view of a dielectric rotor of the sensor according to the second aspect of the present invention.

FIG. 11 is a view of a dielectric rotor 16' of the sensor according to the second aspect of the present invention. The rotor 16' is comprised of three generally circular wedge segments 51, 52, 54 fixedly secured to a shaft 10' at the geometric center of the circle defined by the circumference 16'a. The rotor 16' may be formed of any suitable high dielectric constant material and preferably a material having a dielectric constant of 10 or more. The radius of the rotor 16' is preferred to be greater than the radius of the receiver electrodes A'–H' of FIG. 12 and the radius of the transmitter electrodes E and F. The construction, properties, and positioning of the rotor 16' are analogous to that of the rotor 16 (FIG. 6) previously described according to the first aspect of the present invention.

Figure 12:
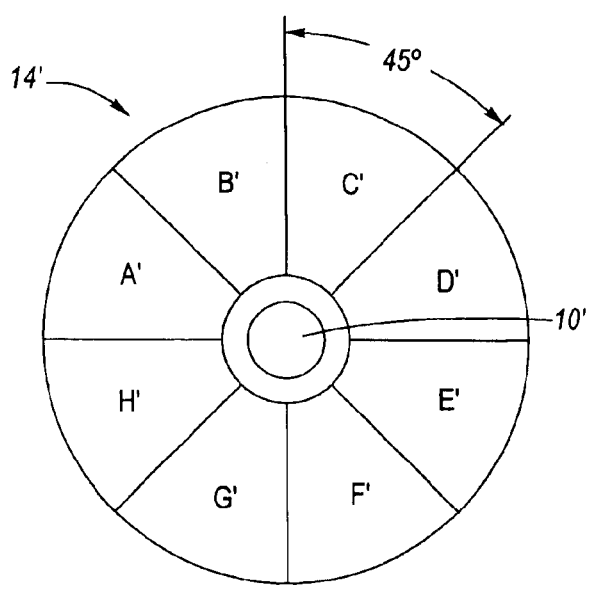
FIG. 12 is a pictorial representation of an electrode face of a receiver capacitor plate of the sensor according to the second aspect of the present invention.

FIG. 12 is a pictorial representation of an electrode face of a receiver capacitor plate 14' of the sensor according to the second aspect of the present invention. The construction, properties, and positioning of the receiver 14' are analogous to that of the receiver 14 (FIGS. 2 and 3) previously described according to the first aspect of the present invention with the exception that the receiver 14' is divided into eight equally sized, roughly pie-shaped electrodes A'–H', instead of four electrodes A–D. The electrodes A'–H' define four receiver electrode pairs A'E', B'F', C'G', and D'H' wherein the electrodes in each pair are located on the plate 14' diametrically opposed to each other.

Figure 13:
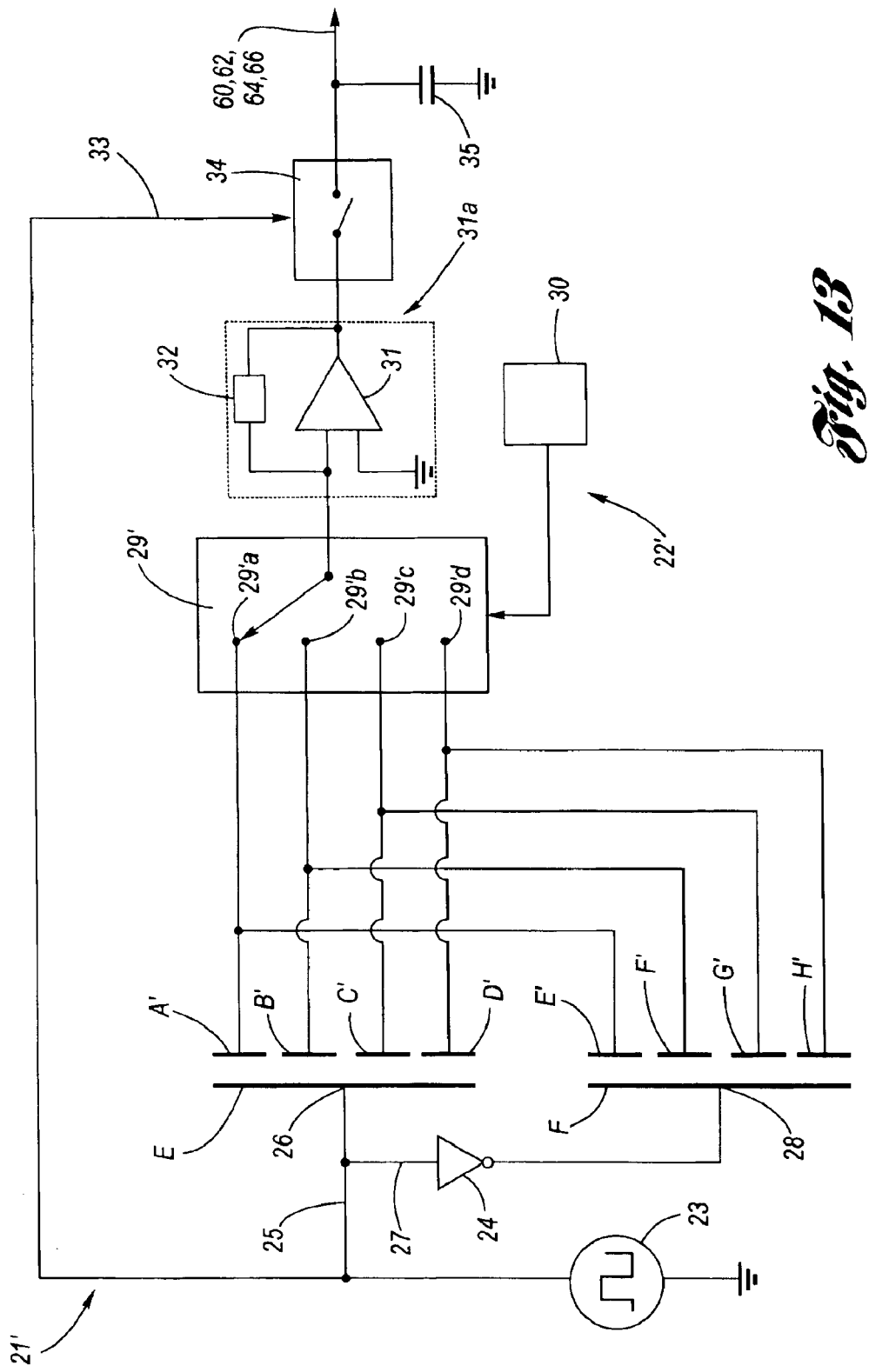
FIG. 13 is a circuit diagram of control circuitry for the sensor according to the second aspect of the present invention.

FIG. 13 shows the circuit block diagram of the circuitry means 21' and 22' with the receiver electrodes A'–H' of receiver plate 14' and transmitter electrodes E and F of transmitter plate 12 schematically represented according to the second aspect of the present invention. Single pole four throw switch 29' selects receiver pairs A'E', B'F', C'G', and D'H' through inputs 29'a, 29'b, 29'c, and 29'd, respectively, in a manner analogous to switch 29 of FIG. 10. The electrical operation of circuitry means 21' and 22' of FIG. 13 is analogous to the electrical operation of circuitry means 21 and 22 of FIG. 10 and will be later described by example.

Figure 14A:
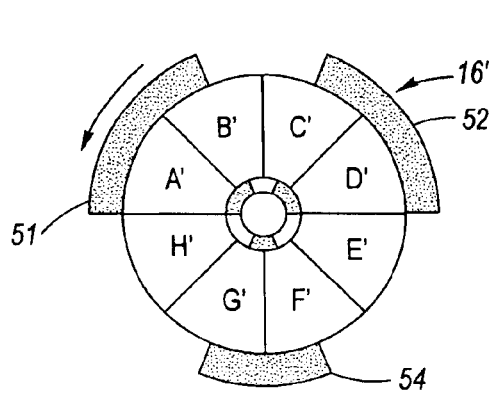
FIGS. 14A–14P are progressive views showing the successive rotational positions of the rotor according to the second aspect of the present invention.
Figure 14B:
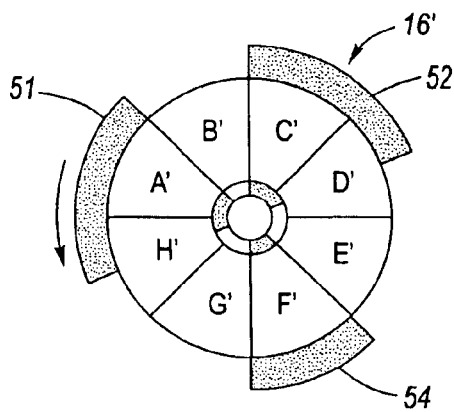
Figure 14C:
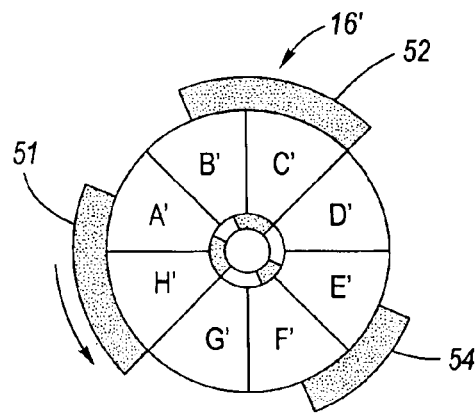
Figure 14D:
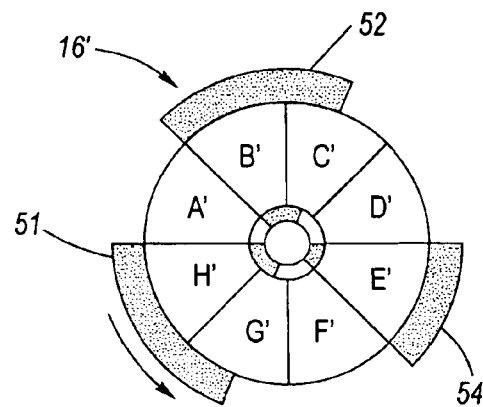
Figure 14E:
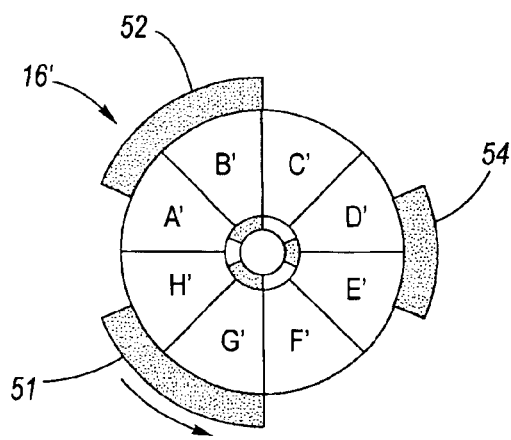
Figure 14F:
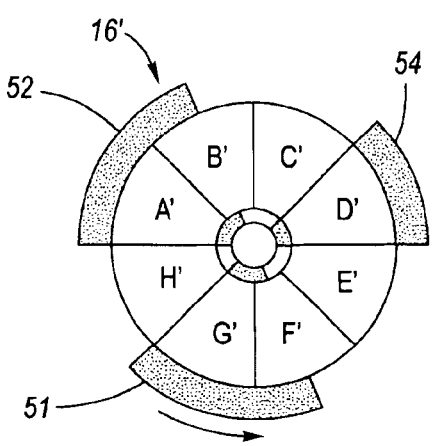
Figure 14G:
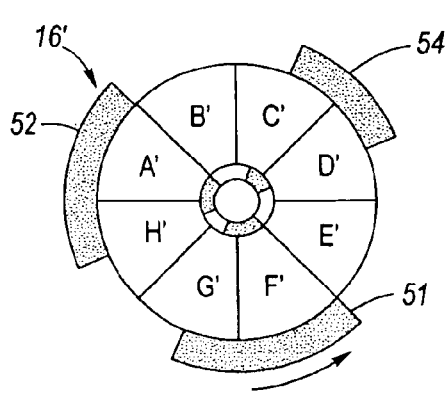
Figure 14H:
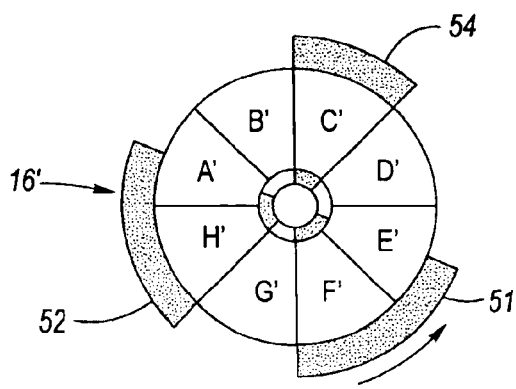
Figure 14I:
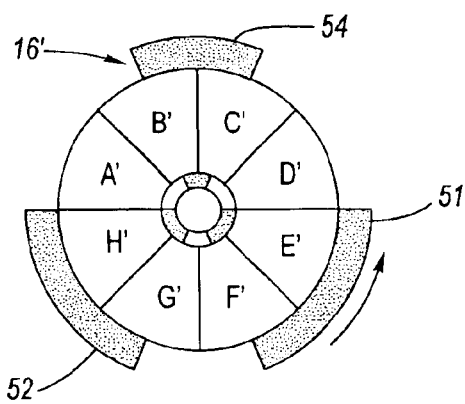
Figure 14J:
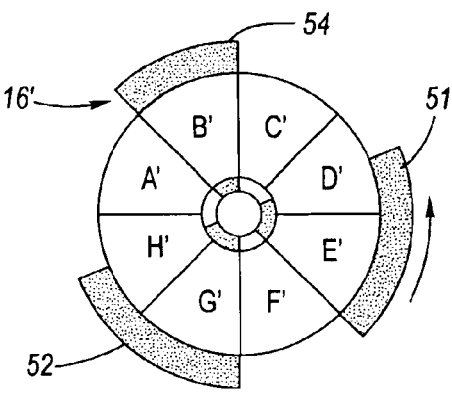
Figure 14K:
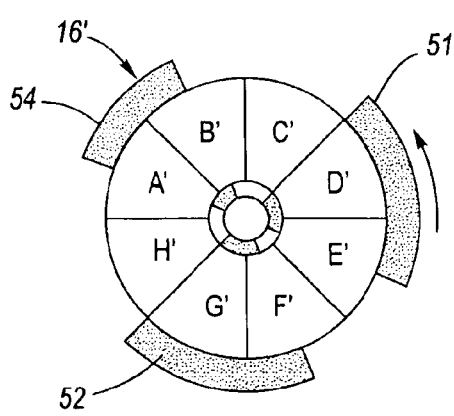
Figure 14L:
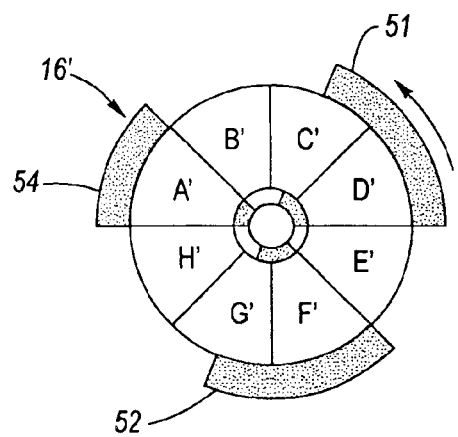
Figure 14M:
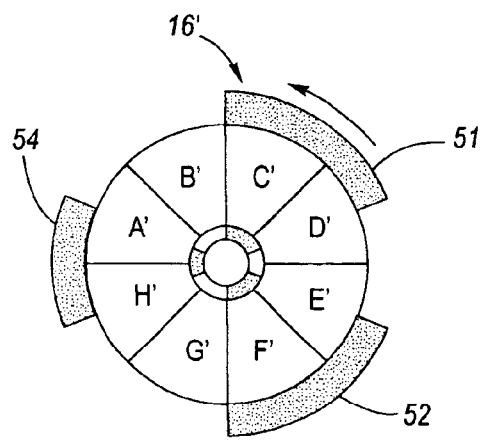
Figure 14N:
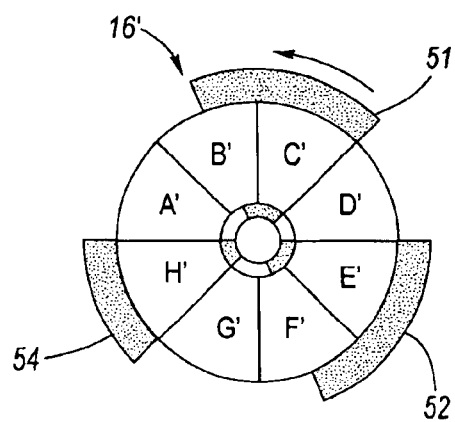
Figure 14O:
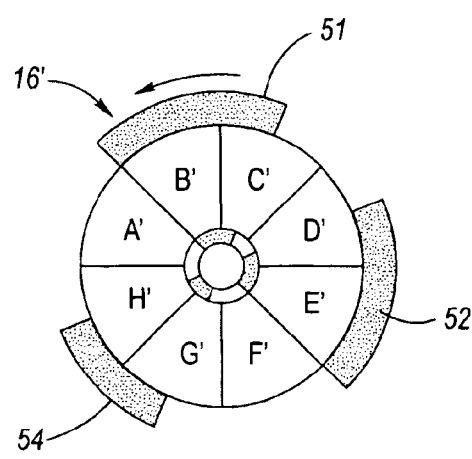
Figure 14P:
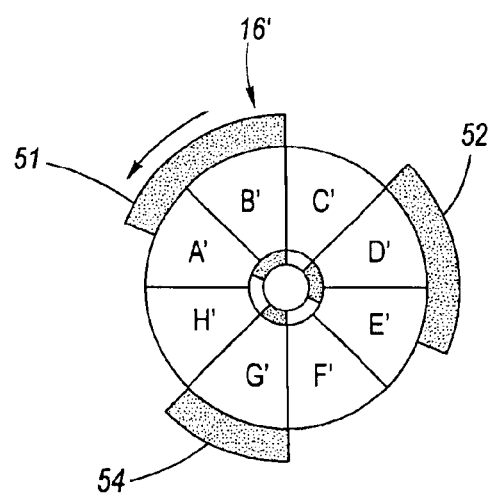

FIGS. 14A–14P are progressive views of successive counterclockwise rotational positions of the rotor 16' from an arbitrary zero degree position of FIG. 14A according to the second aspect of the present invention wherein transmitter electrode E is opposed by receiver electrodes A'–D' and transmitter electrode F is opposed by receiver electrodes E'–H'. The rotor 16' is within the space between transmitter electrode E and F and receiver electrodes A'–H' analogously as described in FIGS. 8A–8D. In operation, receiver electrodes A'–H' are ordered in pairs wherein A'E' constitute a first pair of receiver electrodes, B'F' constitute a second pair of receiver electrodes, C'G' constitute a third pair of receiver electrodes, and D'H' constitute a fourth pair of receiver electrodes. The operation will be exemplified by referring to the position of the rotor 16' as it rotates counterclockwise from the arbitrary zero position of FIG. 14A through FIG. 14P with respect to receiver electrode pair A'E' in an analogous manner as described in FIGS. 8A–8D.

Initially, switch 29' is in, for example, position 29'a thereby selecting receiver electrode pair A'E' and switch 34 closes, for example, on the negative half of the square wave output of generator 23, for example −5 volts DC, via lead 33 resulting in transmitter electrode E having a negative potential and transmitter electrode F having a positive potential, whereby receiver electrode A' is at a positive potential and receiver electrode E' is at a negative potential and the rotor 16' is positioned at the arbitrary zero position of FIG. 14A. At this point in the operation of the sensor, segment 51 of the rotor 16' occupies the entire space between electrodes E and A' while air occupies the entire space between electrodes F and E' by which the capacitor formed by electrodes E and A' has the most charge and the capacitor formed by electrodes F and E' has the least charge due to the high dielectric constant of the segment 51 of the rotor 16' as compared to air. Analogously, as previously described for the configuration of FIGS. 8A–8D, net maximum negative charge from receiver electrode pair A'E' flows through analog switch 29'a into the inverting input of the op amp 31, and maximum positive output voltage of the current to voltage converter 31a passes through the closed synchronous switch 34 to the level hold capacitor 35 as output 60. Thus, a maximum positive DC analog output 60 representing the capacitance of the electrode pair A'E' results. When the generator 23 square wave switches to the positive half of the square wave output of generator 23, for example +5 volts DC, via lead 33, the synchronous switch 34 opens. The level hold capacitor 35 holds the output 60 at a maximum positive until the next negative transition of the generator 23 square wave, whereby the output 60 remains at a maximum positive. As the rotor 16' turns 22.5 degrees counterclockwise from its position in FIG. 14A to its position in FIG. 14B, segment 51 of the rotor 16' still occupies the entire space between electrodes E and A' while air still occupies the entire space between electrodes F and E' thereby maintaining the output 60 maximum positive as described above and exemplified by the plot in FIG. 15 between 0 and 22.5 degrees.

As the rotor 16' turns 22.5 degrees counterclockwise from its position in FIG. 14B to its position in FIG. 14C, segment 51 of the rotor 16' rotates out of the space between electrodes E and A' while segment 54 rotates into the space between electrodes F and E' thereby decreasing the charge on the capacitor formed by electrodes E and A' and increasing the charge on the capacitor formed by electrodes F and E' until in FIG. 14C segment 51 of the rotor 16' occupies half the space between electrodes E and A' while segment 54 occupies half the space between electrodes F and E' at which time the charge on the capacitor formed by electrodes E and A' and the charge on the capacitor formed by electrodes F and E' are equal and opposite by which the net charge is zero. Therefore, on the negative half cycles at the frequency of generator 23, the net negative charge from receiver electrode pair A'E' through analog switch 29'a into the inverting input of the op amp 31 decreases, and the positive output voltage of the current to voltage converter 31a passing through the closed synchronous switch 34 to the level hold capacitor 35 as output 60 also decreases such that the output is zero in FIG. 14C when the net charge is zero, exemplified by the plot in FIG. 15 between 22.5 and 45 degrees.

As the rotor 16' turns 22.5 degrees counterclockwise from its position in FIG. 14C to its position in FIG. 14D, segment 51 of the rotor 16' continues to rotate out of the space between electrodes E and A' while segment 54 continues to rotate into the space between electrodes F and E' thereby decreasing the charge on the capacitor formed by electrodes E and A' and increasing the charge on the capacitor formed by electrodes F and E' until in FIG. 14D air occupies the entire space between electrodes E and A' while segment 54 occupies the entire space between electrodes F and E'. Therefore, analogously as previously described for the configuration of FIGS. 8A–8D, on the negative half cycles at the frequency of generator 23, net positive charge from receiver electrode pair A'E' through analog switch 29'a into the inverting input of the op amp 31 increases, and negative output voltage of the current to voltage converter 31a passing through the closed synchronous switch 34 to the level hold capacitor 35 as output 60 also increases such that the output is at a minimum (maximum negative) in FIG. 14D, exemplified by the plot in FIG. 15 between 45 and 67.5 degrees. When the generator 23 square wave switches to the positive half of the square wave output of generator 23, for example +5 volts DC, via lead 33, the synchronous switch 34 opens. The level hold capacitor 35 holds the output 60 at a minimum until the next negative transition of the generator 23 square wave whereby the output 60 remains minimum.

As the rotor 16' turns 22.5 degrees counterclockwise from its position in FIG. 14D to its position in FIG. 14E, segment 52 of the rotor 16' rotates into the space between electrodes E and A' while segment 54 rotates out of the space between electrodes F and E' thereby increasing the charge on the capacitor formed by electrodes E and A' and decreasing the charge on the capacitor formed by electrodes F and E' until in FIG. 14E segment 52 of the rotor 16' occupies half the space between electrodes E and A' while segment 54 occupies half the space between electrodes F and E' at which time the charge on the capacitor formed by electrodes E and A' and the charge on the capacitor formed by electrodes F and E' are equal and opposite by which the net charge is zero. Therefore, on the negative half cycles at the frequency of generator 23, the net positive charge from receiver electrode pair A'E' through analog switch 29'a into the inverting input of the op amp 31 decreases, and the negative output voltage of the current to voltage converter 31a passing through the closed synchronous switch 34 to the level hold capacitor 35 as output 60 also decreases (becomes more positive) such that the output is zero in FIG. 14E when the net charge is zero, exemplified by the plot in FIG. 15 between 67.5 and 90 degrees.

As the rotor 16' turns 22.5 degrees counterclockwise from its position in FIG. 14E to its position in FIG. 14F, segment 52 of the rotor 16' continues to rotate into the space between electrodes E and A' while segment 54 continues to rotate out of the space between electrodes F and E' thereby increasing the charge on the capacitor formed by electrodes E and A' and decreasing the charge on the capacitor formed by electrodes F and E' until in FIG. 14F segment 52 occupies the entire space between electrodes E and A' while air occupies the entire space between electrodes F and E'. Therefore, analogously as previously described for the configuration of FIGS. 8A–8D, on the negative half cycles at the frequency of generator 23, net negative charge from receiver electrode pair A'E' through analog switch 29'a into the inverting input of the op amp 31 increases, and positive output voltage of the current to voltage converter 31a passing through the closed synchronous switch 34 to the level hold capacitor 35 as output 60 also increases such that the output is at a maximum positive in FIG. 14F, exemplified by the plot in FIG. 15 between 90 and 112.5 degrees. When the generator 23 square wave switches to the positive half of the square wave output of generator 23, for example +5 volts DC, via lead 33, the synchronous switch 34 opens. The level hold capacitor 35 holds the output 60 at a maximum until the next negative transition of the generator 23 square wave whereby the output 60 remains maximum. As the rotor 16' turns 22.5 degrees counterclockwise from its position in FIG. 14F to its position in FIG. 14G, segment 52 of the rotor 16' still occupies the entire space between electrodes E and A' while air still occupies the entire space between electrodes F and E' thereby maintaining the output 60 maximum positive as described above and exemplified by the plot in FIG. 15 between 112.5 and 135 degrees.

Figure 15:
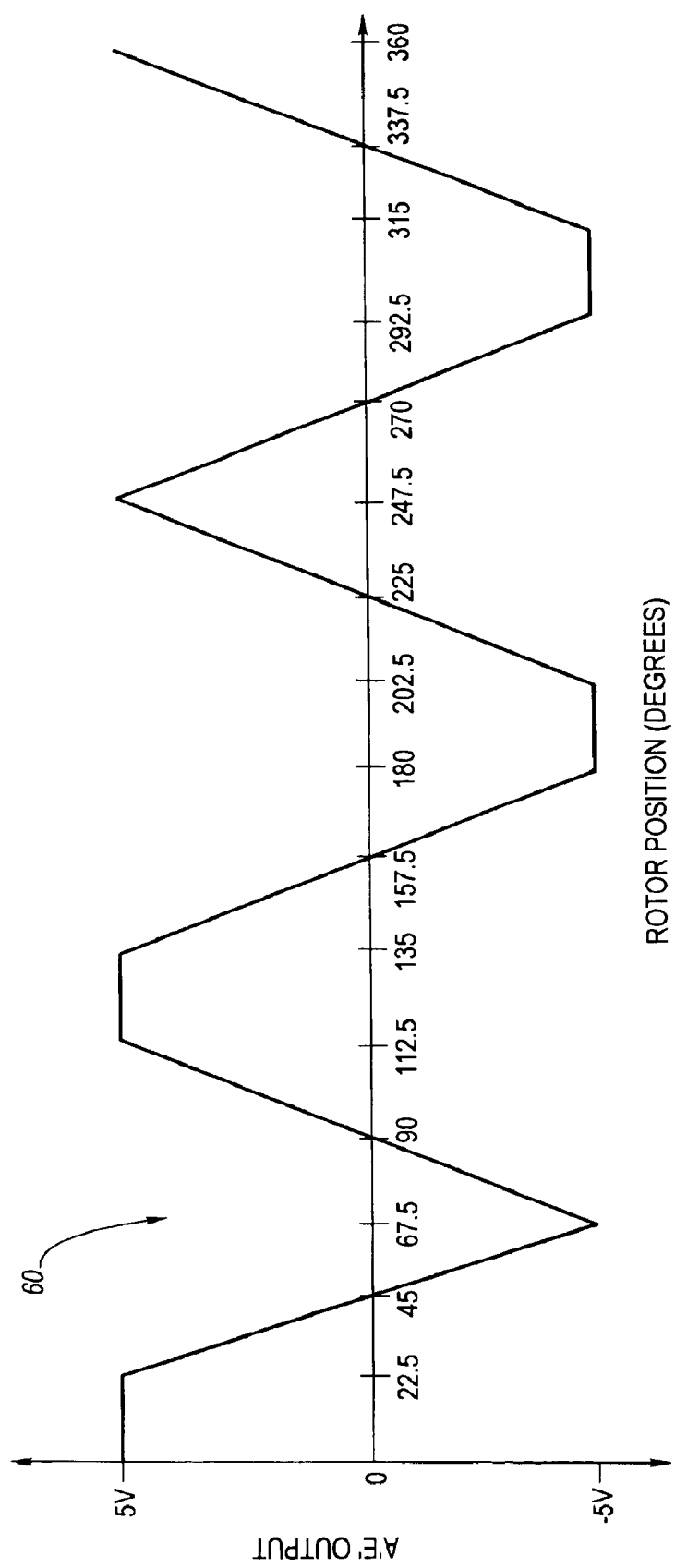
FIG. 15 is a graph of a first receiver electrode pair output related to the rotational positions of the rotor according to the second aspect of the present invention.

As the rotor 16' turns 45 degrees counterclockwise from its position in FIG. 14G to its position in FIG. 14I, segment 52 of the rotor 16' rotates out of the space between electrodes E and A' while segment 51 rotates into the space between electrodes F and E' in an analogous manner to segment 51 and 54, respectively, of FIGS. 14B–14D thereby resulting in a decrease of output 60 from a maximum in FIG. 14G to a minimum in FIG. 14I analogously as previously described for FIGS. 14B–14D and exemplified by the plot in FIG. 15 between 135 and 180 degrees. As the rotor 16' turns 22.5 degrees counterclockwise from its position in FIG. 14I to its position in FIG. 14J, air still occupies the entire space between electrodes E and A' while segment 51 of rotor 16' still occupies the entire space between electrodes F and E' thereby maintaining the output 60 minimum as described above and exemplified by the plot in FIG. 15 between 180 and 202.5 degrees.

As the rotor 16' turns 45 degrees counterclockwise from its position in FIG. 14J to its position in FIG. 14L, segment 54 of the rotor 16' rotates into the space between electrodes E and A' while segment 51 rotates out of the space between electrodes F and E' in an analogous manner to segment 52 and 54, respectively, of FIGS. 14D–14F thereby resulting in an increase of output 60 from a minimum in FIG. 14J to a maximum in FIG. 14L analogously as previously described for FIGS. 14D–14F and exemplified by the plot in FIG. 15 between 202.5 and 247.5 degrees.

As the rotor 16' turns counterclockwise from 247.5 to 360 degrees from its position in FIG. 14L through its positions in FIGS. 14M–14P and back to its position in FIG. 14A, the output 60 exemplified by the plot in FIG. 15 between 247 and 360 degrees is obtained analogously to the rotor turning counterclockwise from its position in FIG. 15G through its positions in FIGS. 14H–14L as previously described and exemplified by the plot in FIG. 15 between 135 and 247.5 degrees. FIG. 15, therefore, represents the output 60 for one revolution of the rotor 16' with respect to the receiver electrode pair A'E'.

Figure 16:
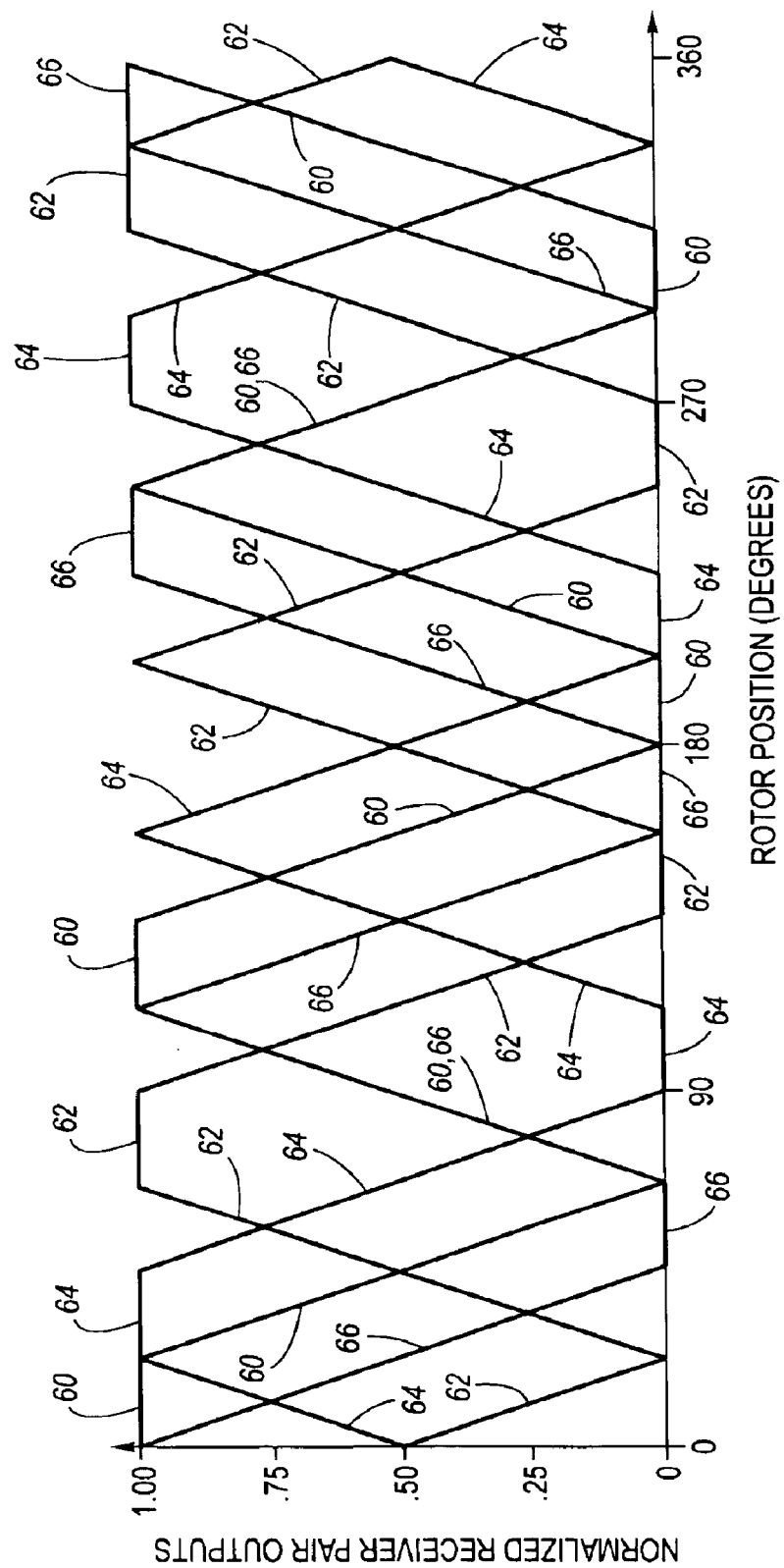
FIG. 16 is a graph of sensor outputs related to the rotational positions of the rotor according to the second aspect of the present invention.

When switch 29' is connected to its inputs 29'b, 29'c, and 29'd the output curves 62, 64, and 66 for receiver electrode pairs B'F', C'G', and D'H', respectively, are developed. These curves are shown in FIG. 16. It is to be noted that the level hold capacitor 35 may also be only connected by the synchronous switch 34 during the positive portion of the generator 23 cycle instead of the negative portion to obtain correspondingly similar output curves.

In normal operation of the first and second aspects of the present invention, a microcontroller 30 operates the receiver pair select analog switch 29 and 29' and the DC analog outputs 48, 50, 60, 62, 64, and 66, preferably, connect to an analog-to-digital (A/D) input of the microcontroller 30. The microcontroller 30 is a standard microcontroller used for automotive applications and can be included as part of the sensor or it can be the engine microcontroller sending and receiving data discussed herein through, for example, the electrical connector 45 of the sensor which is shown in FIG. 7 according to the first aspect of the present invention. The microcontroller 30 selects a receiver pair through analog switch 29 and 29', waits a few time periods of the generator 23, and then measures the DC analog output voltage. The microcontroller 30 then switches to the next receiver pair through analog switch 29 and 29' to repeat the process of measuring the DC analog output voltage.

With the measured pair of output voltages from the receiver electrode pairs, a simple lookup table developed according to the procedure outlined above, and located in memory of the microcontroller 30 or the engine microcontroller, can determine the absolute angular position. The microcontroller 30 or the engine microcontroller can then output a digital signal or an analog level or an output in any required format. If the microcontroller 30 is utilized, this signal would, probably, be sent to the engine microcontroller.

The sensor of the present invention will be seen to provide many important advantages. Specifically, all of the materials utilized in the sensor are relatively low cost materials so that the overall cost of the sensor is relatively low. Further, the sensor may be provided in a relatively small package which is desirable in automotive applications. Also, since the present invention uses at least two pairs of receiver electrodes, at any time at least one pair of the electrode output signals gives a pure temperature effect. This information can be used to compensate the temperature impact on the results of the measurements. Of course, only one transmitter electrode can be used, but the sensor can then only measure the angular position over a 180 degree rotation of the rotatable body 10, which is acceptable for many applications.

While the present invention has been described in connection with what is presently considered to be the most practical and preferred embodiment, it is to be understood that the present invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sensor assembly for sensing angular position of one object relative to another object, said sensor assembly comprising:

a transmitter capacitor plate defining a transmitter surface area, said transmitter surface area comprising at least one transmitter electrode;

a receiver capacitor plate disposed in stationary, juxtaposed relation to said transmitter capacitor plate, said receiver capacitor plate defining a receiver surface area facing said transmitter surface area, said receiver surface area generally corresponding in size to said transmitter surface area, said receiver surface area comprising at least two receiver electrodes forming at least one receiver electrode pair;

a rotor composed of a dielectric material disposed within an air gap between the transmitter and receiver surface areas, said rotor comprising three wedge shaped segments having a common rotor center, wherein a first segment subtends substantially 67.5 degrees about said rotor center, a second segment subtends substantially 67.5 degrees about said rotor center and a third segment subtends substantially 45 degrees about said rotor center, and wherein the first segment is separated from the second segment by a vacancy subtending substantially 45 degrees about said rotor center and wherein the third segment is disposed, relative to said rotor center, diametrically opposite said vacancy in substantially equidistant disposition between to said first and second segments, wherein rotation of said rotor relative to said transmitter and receiver capacitor plates varies capacitance between said at least one transmitter electrode and said at least two receiver electrodes; and means for measuring net charge induced on said at least one receiver electrode pair, wherein the charges indicate the angular position of said rotor relative to said transmitter and receiver capacitor plates.

2. The sensor assembly of claim 1, wherein:

said transmitter capacitor plate has a transmitter plate center axially aligned with said rotor center, said at least one transmitter electrode comprising a semi-circularly shaped first transmitter electrode and a semi-circularly shaped second transmitter electrode disposed diametrically opposite, with respect to said transmitter plate center, said first transmitter electrode; and said receiver capacitor plate has a receiver plate center axially aligned with said rotor center, said at least two receiver electrodes comprising at least four wedge-shaped receiver electrodes, each receiver electrode being connected to a respectively counterpart receiver electrode disposed diametrically opposite thereto with respect to said receiver plate center so as to respectively provide a said receiver electrode pair.

3. The sensor assembly of claim 2, wherein said segments define a first circular periphery concentric with respect to said rotor center, said first and second transmitter electrodes define a second periphery adjacent a transmitter plate outside edge, and said at least four receiver electrodes define a third periphery adjacent a receiver plate outside edge; wherein said second and third peripheries are substantially equivalent and wherein said first periphery is larger than said second and third peripheries.

4. The sensor assembly of claim 2, wherein said means for measuring comprises:

an excitation signal source supplying excitation signals to said first and second transmitter electrodes; and charge to voltage measuring means for providing a voltage responsive to the net charge respectively induced on each said receiver electrode pair, wherein the voltages are indicative of the angular position of said rotor relative to said transmitter and receiver capacitor plates.

5. The sensor assembly of claim 4, wherein said plurality of receiver electrodes comprises eight receiver electrodes.

6. The sensor assembly of claim 5, wherein said segments define a first circular periphery concentric with respect to said rotor center, said first and second transmitter electrodes define a second periphery adjacent a transmitter plate outside edge, and said at least four receiver electrodes define a third periphery adjacent a receiver plate outside edge; wherein said second and third peripheries are substantially equivalent and wherein said first periphery is larger than said second and third peripheries.

7. The sensor assembly of claim 4, wherein said means for measuring comprises:

a source of alternating current providing a first alternating current signal to said first transmitter electrode;

an analog inverter providing, in combination with said source of alternating current, a second alternating current signal to said second transmitter electrode;

a current to voltage converter providing a voltage responsive to the net charge respectively induced on each said receiver electrode pair; and a receiver pair select switch which selects connection of each said receiver electrode pair individually to said current to voltage measuring means;

wherein the voltages are indicative of angular position of said rotor relative to said receiver and transmitter capacitor plates.

8. The sensor assembly of claim 7, wherein said plurality of receiver electrodes comprises eight receiver electrodes.

9. The sensor assembly of claim 8, wherein said segments define a first circular periphery concentric with respect to said rotor center, said first and second transmitter electrodes define a second periphery adjacent a transmitter plate outside edge, and said at least four receiver electrodes define a third periphery adjacent a receiver plate outside edge; wherein said second and third peripheries are substantially equivalent and wherein said first periphery is larger than said second and third peripheries.

10. A sensor assembly for sensing angular position of one object relative to another object, said sensor assembly comprising:

a transmitter capacitor plate defining a transmitter surface area, said transmitter surface area comprising a semicircularly shaped first transmitter electrode and a semicircularly shaped second transmitter electrode disposed diametrically opposite, with respect to said transmitter plate center, said first transmitter electrode;

a receiver capacitor plate disposed in stationary, juxtaposed relation to said transmitter capacitor plate, said receiver capacitor plate defining a receiver surface area facing said transmitter surface area, said receiver surface area generally corresponding in size to said transmitter surface area, said receiver surface area comprising eight wedge-shaped receiver electrodes, each receiver electrode being connected to a respectively counterpart receiver electrode disposed diametrically opposite thereto with respect to said receiver plate center so as to respectively provide a receiver electrode pairs, whereby said receiver electrodes provide four receiver electrode pairs;

a rotor composed of a dielectric material disposed within an air gap between the transmitter and receiver surface areas, said rotor comprising three wedge shaped segments having a common rotor center, wherein a first segment subtends substantially 67.5 degrees about said rotor center, a second segment subtends substantially 67.5 degrees about said rotor center and a third segment subtends substantially 45 degrees about said rotor center, and wherein the first segment is separated from the second segment by a vacancy subtending substantially 45 degrees about said rotor center and wherein the third segment is disposed, relative to said rotor center, diametrically opposite said vacancy in substantially equidistant disposition between to said first and second segments, wherein rotation of said rotor relative to said transmitter and receiver capacitor plates varies capacitance between said first and second transmitter electrodes and said receiver electrodes; and means for measuring net charge induced on each said receiver electrode pair, wherein the charges indicate the angular position of said rotor relative to said transmitter and receiver capacitor plates.

11. The sensor assembly of claim 10, wherein said transmitter capacitor plate has a transmitter plate center axially aligned with said rotor center and a transmitter plate outside edge concentrically disposed with respect to said transmitter plate center; and wherein said receiver capacitor plate has a receiver plate center axially aligned with said rotor center and a receiver plate outside edge concentrically disposed with respect to said receiver plate center.

12. The sensor assembly of claim 11, wherein said segments define a first circular periphery concentric with respect to said rotor center, said first and second transmitter electrodes define a second periphery adjacent said transmitter plate outside edge, and said receiver electrodes define a third periphery adjacent said receiver plate outside edge; wherein said second and third peripheries are substantially equivalent and wherein said first periphery is larger than said second and third peripheries.

13. The sensor assembly of claim 12, wherein said means for measuring comprises:

an excitation signal source supplying excitation signals to said first and second transmitter electrodes; and a current to voltage converter providing a voltage responsive to the net charge respectively induced on each said receiver electrode pair, wherein the voltages are indicative of the angular position of said rotor relative to said transmitter and receiver capacitor plates.

14. The sensor assembly of claim 12, wherein said means for measuring comprises:
   a square wave generator generating a first alternating current signal to said first transmitter electrode;
   an analog inverter generating, in combination with said square wave generator, a second alternating current signal to said second transmitter electrode;
   a current to voltage converter providing a voltage responsive to the net charge respectively induced on each said receiver electrode pair; and
   a receiver pair select switch which selects connection of each said receiver electrode pair individually to said current to voltage measuring means;
   wherein the voltages are indicative of angular position of said rotor relative to said receiver and transmitter capacitor plates.

* * * * *